United States Patent Office 2,769,889
Patented Nov. 6, 1956

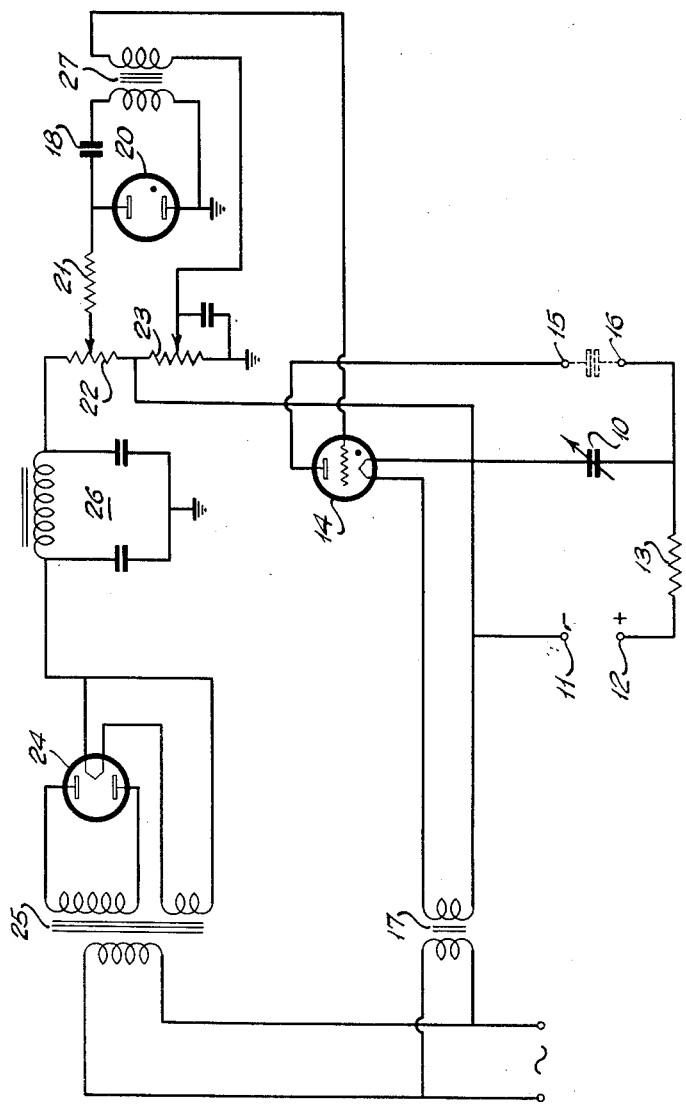

2,769,889

MANUFACTURE OF ELECTRICAL CAPACITORS

William Dubilier, New Rochelle, N. Y., assignor to Cornell-Dubilier Electric Corporation, South Plainfield, N. J., a corporation of Delaware Original application June 25, 1951, Serial No. 233,315. Divided and this application August 13, 1953, Serial No. 374,094

4 Claims. (Cl. 219—19)

This application is a division of application Serial No. 233,315, filed June 25, 1951, entitled Means for and Method of Manufacturing Electrical Capacitors, now abandoned.

The present invention relates to electrical capacitors of the type using paper or an equivalent material as a dielectric which may be impregnated with a different insulating or dielectric substance.

Such condensers may be made by winding up two metal layers, such as thin foils, separated by two or more sheets of paper impregnated with a further dielectric material, such as wax, oil or a synthetic insulating compound. Both the paper and impregnant contribute to the characteristics and performance of the capacitor, such as to the resultant dielectric constant, insulating resistance and power factor.

In constructing wound paper capacitors, it frequently happens that particles of dirt or conducting matter are wound in between the several layers of paper or metal foil in such a manner that the subsequent manipulation of the capacitor for use will cause the particles to puncture the dielectric between adjacent conducting surfaces and thus short-circuit the capacitor. Furthermore, capacitor paper, usually made of wood pulp, contains impurities or imperfections liable to cause or give rise to injurious discharges and short-circuits, if a voltage is applied to the terminals of the capacitor.

Such imperfections in the paper or dielectric are of an especially serious nature in so-called metallized paper capacitors, which comprise at least one layer of paper or an equivalent dielectric base coated on one or both sides with a thin coherent layer of conducting particles deposited thereon by evaporation or by any other process. In practice, very thin paper is commonly used for capacitors of this type, having a thickness as low as .0004" or less and, as a result, a capacitor having one or more paper layers initially contains a large number of short-circuits or faulty spots, due both to the imperfections in the paper and produced by the deposition of the metal layer or coating process, as well as during the assembly of the unit.

If a capacitor with a short-circuit or fault as described has applied to it a voltage equal to or higher than the operating voltage, it will either be destroyed immediately by the short-circuit current or a gradual corona or other discharges will occur, resulting in a final breakdown or short-circuit and destruction of the capacitor after a relatively short operating period.

In view of the foregoing phenomena and difficulties, it has been customary in the past to clear capacitors, in particular those of the single-paper and metallized paper type, of short-circuits or faulty spots in the dielectric by burning out the conducting or defective areas or paths in the paper dielectric between the strips of metal foil or electrode coatings, by applying a suitable direct current to the terminals of the finished impregnated capacitor.

More particularly, in the case of metallized paper capacitors, using extremely thin metal layers or coatings deposited upon the paper or other dielectric base, application of a suitable short-circuiting current will result in a burning or evaporation of the thin metal layer in the vicinity of the fault or short-circuit spot, without seriously affecting or burning the paper dielectric, in such a manner that the faulty spot or area will be separated by a sufficiently long insulating path from the electrodes under tension. A basic requirement for such a burn-out or clearing of the capacitor of short-circuits or faulty spots, is the proper control of the burn-out energy or heat produced by the short-circuit or clearing current, in such a manner as to be effective in melting and evaporating the metal layer to a sufficient extent from the fault or short-circuit point, while being insufficient to materially affect or carbonize the paper dielectric, although some carbonization can not be avoided in practice.

A similar consideration applies to capacitors using separate metallic and dielectric elements, especially single-paper capacitors, although in this case a clearing or burn-out of the short-circuit or defective spots is more difficult in view of the greater thickness of the metal electrodes.

In the past, it has been customary in the manufacture of electrical capacitors, especially those made with impregnated paper, to test and clear the units of short-circuits after they have been thoroughly impregnated. Such tests are usually made to detect direct short-circuits, but they would not detect imperfect or defective spots in the dielectric itself, especially such weak spots which are dangerous at operating voltage in causing corona and similar discharges liable to result in a gradual deterioration and final destruction of the dielectric and breakdown of the capacitor after a relatively short operating period.

Moreover, testing of an impregnated unit in order to clear short-circuits or weak spots in the dielectric, necessarily will result in a deleterious effect upon the dielectric, i. e. both the paper and impregnant, as it is practically impossible to so control the burn-out energy for the various dielectrics and impregnating materials and different operating conditions existing in each case, as to effectively clear the short-circuit or fault in the manner pointed out, without affecting the dielectric in the vicinity of the short-circuit path. As a result, a certain degree of carbonization of the paper and impairment of the impregnant in the neighborhood of the short-circuit can not be avoided in practice.

This drawback assumes an especially serious nature in the case of metallized capacitors, in which case the number of short-circuits or faulty spots may be considerable, so as to result in a substantial change of the final characteristics of the capacitor, due to the many burn-out or short-circuit points throughout the entire capacitor. In particular, carbonization of the paper and deterioration of the impregnant near the short-circuit or faulty points, although negligible when considering a single or limited number of burn-outs, when considered for the entire capacitor having a considerable number of faults or burnouts, will result in an impairment of the electrical characteristics, in particular a decrease of the insulation resistance of the finished capacitor.

As an example, an impregnated paper capacitor of standard design having an initial insulating resistance of say 50,000 megohms will be reduced to 40,0000 megohms after being subjected to a first clearing or burn-out test by a voltage equal to or somewhat greater than the rated or operating voltage of the capacitor, while this value may be further reduced to 30,000 megohms by a subsequent test and so forth, until the capacitor finally breaks down completely and will be destroyed. The same phenomena occur in actual operation as a result of excess voltages, surges and other high tension phenomena, although spread over a longer period, thus greatly reducing the useful life of the capacitor.

An object of the present invention is to provide improved means for making electrical capacitors using impregnated paper or an equivalent composite dielectric, whereby the capacitor may be cleared of short-circuits and faulty spots in the dielectric, substantially without affecting its electrical characteristics, in particular its insulating resistance and power factor.

Still another object is the provision of means for and a method of making paper capacitors which will enable the attainment of uniform characteristics and result in a substantial reduction of the number of rejects or defective units during manufacture.

A further object is the provision of a simple and reliable impulse testing arrangment for clearing and testing electrical capacitors, especially of the metallized paper type.

The above and further objects and novel aspects of the invention will be better understood by the following detailed description considered in conjunction with the accompanying drawing, showing a circuit diagram of a preferred form of testing system according to the invention.

The invention is especially suitable to the clearing of a wound electrical capacitor before impregnation by a testing voltage or current applied to the electrodes in the form of periodic impulses of definite amplitude and duration, to closely control the electrical burn-out energy. In this manner, by testing the un-impregnated condenser, any physical or chemical changes of the dielectric and impregnant caused by the testing or clearing current is avoided, while the use of current impulses for effecting the clearing or burn-out provides a simple and efficient means to limit and control the burn-out energy so as to be most effective in clearing the short-circuits and faults in the dielectric, substantially without regard to the paper dielectric and impregnating medium later to be introduced by the impregnating process. As a matter of fact, the effect of any carbonization or other undesirable change of paper dielectric resulting from the burn-out current, will be substantially minimized or overcome by the subsequent impregnation of the capacitor by a suitable insulating material, such as wax, oil or a synthetic compound well known in the art.

The testing or burning out of the capacitor in its wound but un-impregnated state by closely controlled amounts of burn-out energy bursts or pulses, has the further advantage of containing or restricting the burning-out process to the short-circuit or defective spots, on the one hand, and enabling a uniform and simultaneous clearing of the entire dielectric of the capacitor by a single operation in a most efficient and reliable manner.

In other words, the capacitors according to the invention are subjected to an accelerated life test as far as the burn-out or self-healing of the short-circuits or faults are concerned, such tests, however, being carried out under conditions differing from the actual operating condition, viz. in the un-impregnated state of the capacitor, to substantially avoid the previous defects and drawbacks inherent in the self-healing or burn-out process, in particular the reduction of the insulation resistance and power factor of the capacitor.

In carrying out the invention, a single paper provided with the proper metallic layer or coatings thereon or a number of separate foil and paper strips are wound into a convolute capacitor unit in accordance with standard practice. Instead of these units being impregnated as has been the custom, they are connected to a testing voltage above the operating voltage for a short period of time, preferably by connecting the unit to a charged storage capacitor to provide a measured amount of burn-out energy and to closely control the clearing of the faults, substantially without carbonization of the dielectric.

The accompanying drawing shows a circuit diagram of a preferred automatic testing system according to the invention.

In the drawing, the numeral 10 represents an adjustable storage capacitor connected to a source of direct current indicated by the terminals 11 and 12 in series with a high-ohmic resistor 13. A further shunt circuit connected across the capacitor 10 comprises the cathode-anode path of a gaseous discharge tube or thyratron 14 in series with the capacitor to be tested, to be connected between terminals 15 and 16. The thyratron 14 may be of standard construction comprising a cathode heated to proper electron emitting temperature from an alternating current source through a heating transformer 17, a grid or control electrode and a plate or anode. The grid is normally biased negatively with respect to the cathode just below the critical or breakdown potential of the tube, the normal or steady bias having superimposed thereon an alternating control voltage, to periodically raise or lower the grid potential above and below the critical value at a given rate or frequency. Capacitor 10 may be a single variable unit or a bank of capacitor units connected in parallel.

In the example shown, the steady grid bias for the thyratron 14 is derived from the output potentiometer or voltage divider of a rectifier power supply comprising a pair of resistors 22 and 23 connected in series. The rest of the power supply circuit shown is of standard construction and comprises an input transformer 25, double-wave rectifier 24 and smoothing filter 26 to convert the alternating voltage into a smooth or steady direct current voltage across the potentiometer 22, 23. In order to provide a negative grid bias potential for the thyratron 14, the grid of the latter is connected to an intermediate point on the potentiometer resistor 23 near the low voltage or ground side of the circuit, the cathode of the thyratron being connected to the junction between the resistors 22 and 23 or a point which is positive in respect to the grid potential.

The alternating current control voltage superimposed upon the steady grid bias voltage is produced, in the example shown, by means of a gas tube or relaxation oscillator energized by the potentiometer 22, 23 and comprising a high ohmic resistance 21 in series with a capacitor 18, the latter being shunted by a two-element gas discharge tube 20. In a circuit of this type, the condenser 18 is charged slowly through the resistance 21 until reaching a potential equal to the ionization or breakdown potential of the tube 20, thus causing a breakdown of the latter and discharge of the condenser. The condenser is then charged again and the cycle repeated, thus resulting in the generation of an alternating current or voltage of a frequency determined by the size of the capacitor 18 and the value of the resistance 21. This voltage is applied to the grid and cathode of the tube 14 by way of a transformer 27.

In testing or clearing a condenser connected to the terminals 15 and 16, the operation of the circuit described above is as follows: Assuming that the capacitor 10 has been charged to the full voltage of the voltage testing source connected to terminals 11 and 12, and, provided further that the steady potential on the grid of the tube 14 is less than the critical or breakdown potential, a low voltage gas discharge or arc will be initiated through the tube during a positive half cycle of the control voltage supplied by the relaxation oscillator 18, 20, 21, causing initiation of a low voltage ionic discharge and a current to flow through the tube and one or more of the short-circuit points of the capacitor under test connected between terminals 15 and 16.

The capacitor 10 is so designed as to perform the double function of providing limited amounts of electrical energy sufficient to clear the short-circuit points of a capacitor under test, while substantially preventing carbonization or other deterioration of the paper dielectric, on the one hand, and to serve as a means for interrupting the discharge through the tube 14 after its charge has been reduced to a point insufficient to maintain an ionic discharge current through the tube. The resistor 13 is so designed as to result in a slow or gradual charging of the capacitor 10, on the one hand, and to prevent a direct discharge of the source voltage through the tube 14. After the capacitor 10 has been discharged, the tube 14 will be extinguished, thus interrupting the current through the capacitor under test. The source voltage is unable to maintain or reestablish the discharge through the tube 14 on account of the limiting resistance 13, so that the capacitor 10 is gradually recharged to initiate a new testing cycle the frequency of the spontaneous testing cycles thus obtained depending upon the time constant of the storage capacitor 10 and series resistor 13.

In order to more accurately determine the charge and discharge of capacitor 10 and to insure its being charged to the full testing voltage during each testing cycle, the tube 14 is periodically rendered conducting and non-conducting by the effect of the alternating control voltage of the relaxation oscillator, in the manner described before. For this purpose, the time constant of resistance 13 and capacitor 10 is chosen to be less than the time constant of resistance 21 and capacitor 18 of the relaxation oscillator. In other words, the frequency of the control impulses applied to the grid of the thyratron 14 should be less than the spontaneous charging and discharging frequency of the storage capacitor 10.

Accordingly, a series of short-circuiting or clearing current pulses of definite amplitude and frequency are applied to the capacitor under test, as indicated by the gas discharge through the tube 14 in the form of luminous flashes. The clearing current pulses and luminous flashes will continue until the impedance of the capacitor under test has reached a sufficiently high value to cause the anode potential of the tube 14 to fall below the critical or firing potential for a given grid bias comprising the steady bias and the periodic bias voltage supplied by the relaxation oscillator 18, 20, 21. This makes it possible by the proper choice of the tube parameters and/or bias potentials to automatically clear a capacitor to have a desired insulating resistance or impedance, substantially without measurement or comparison with standard devices. As soon as all the short-circuits through the capacitor under test have been cleared in this manner, the tube will cease to flash or operate, thus apprising the operator that the capacitor has been substantially cleared of short-circuited and faulty spots.

If the dry and unimpregnated capacitor were tested by continuously connecting it to a higher testing voltage or to the standard test voltage for the finished condenser, it would result in a quick breakdown and carbonization of the dielectric material, the breakdown occurring at the weakest spot in the dielectric. By the method above described, the breakdown current is of such a short duration or the burn-out energy clearly limited and applied in properly timed sequence to merely cause the burning away of the metal around the defective spots or short-circuits, but being of insufficient duration to carbonize or otherwise materially injure the paper or other dielectric material.

If, nevertheless, a slight carbonization of the paper or dielectric material near the short-circuit point should occur, due to variations in the dielectric or lack of close control or dissipation of the heat produced by the burn-out current, this will not have any injurious effect on the capacitor, as the unit will be subsequently thoroughly impregnated with an insulating compound, whereas with the old method of testing the impregnated unit, in addition to the effect of the burn-out current on the impregnant, the carbonized particles will remain and cause the capacitor to become defective after a relatively short operating period.

It is thus possible by the use of the invention to test a capacitor having a rated or operating voltage of say 200 volts at a voltage of 300 volts in its dry and impregnated condition. If this capacitor, after testing, is then impregnated with an insulating compound and used on an operating voltage of 200 volts, it will last almost indefinitely, and can, if desired be used with higher operating voltages for a considerable length of time and without substantial variation of its electrical characteristics, in particular the insulating resistance and power factor of the capacitor.

In the foregoing, the invention has been described with reference to a specific illustrative device. It will be evident, however, that modifications, as well as the substitution of equivalent parts or circuits for those disclosed for illustration, may be made without departing from the inventive concept herein disclosed and defined in the appended claims, and it is desired, therefore, that the specification and drawing be regarded in an illustrative rather than a limiting sense.

I claim:

1. Apparatus for automatically increasing the leakage resistance of electrical capacitors by clearing inter electrode short circuits and faults therein comprising a storage capacitor, a charging circuit connected across said storage capacitor including a direct current voltage source connected in series with a charging resistor, a shunt discharge circuit connected across said storage capacitor including a capacitor to be cleared and a gaseous discharge tube disposed in series with said last-mentioned capacitor and responsive to the state of charge of said storage capacitor and the leakage resistance of said capacitor to be cleared for sequentially and automatically opening and closing said shunt discharge circuit.

2. Apparatus for automatically increasing the leakage resistance of electrical capacitors by clearing inter electrode short circuits and faults therein comprising a storage capacitor, a charging circuit connected across said storage capacitor including a direct current source connected in series with a charging resistor, a gaseous discharge tube having a pair of main electrodes and a control electrode, a shunt discharge circuit connected across said storage capacitor including a capacitor to be cleared disposed in series with the main discharge path of said tube, means for generating a periodic control potential having a frequency less than the spontaneous charging and discharging frequency of said storage capacitor and means applying said periodic control potential to the control electrode of said tube for permitting continuing repetitive ionic discharge of said tube and consequent discharge of said storage capacitor through said capacitor to be cleared until the leakage resistance of said last-mentioned capacitor increases to such a value as to prevent ionic discharge of said gaseous discharge tube.

3. Apparatus for clearing short circuits and faults in electrical capacitors comprising a storage capacitor, a charging circuit connected across said storage capacitor including a source of direct current voltage in series with a high-ohmic charging resistor, a gaseous discharge tube having a pair of main electrodes and a discharge initiating control electrode, a discharging circuit also connected across said storage capacitor including the main discharge path of said tube in series with a capacitor to be cleared, means for applying a steady bias potential to said control electrode close to and below the breakdown potential of said tube, and a relaxation oscillator comprising a further resistor in series with a further capacitor shunted by a gaseous discharge tube to produce a periodic control potential, means to apply said control potential to said control electrode superimposed upon said bias potential to periodically raise said bias potential above the breakdown potential of said tube, the time constant of said further capacitor and resistor being in excess of the time constant of said storage capacitor and charging resistor.

4. A device for clearing short circuits and faults in electrical capacitors comprising a storage capacitor, a charging circuit connected across said storage capacitor including a source of direct current voltage in series with a high-ohmic charging resistor, a gaseous discharge tube having a pair of main electrodes and a discharge initiating control electrode, a discharging circuit also connected across said storage capacitor including a capacitor to be cleared in series with the main discharge path of said tube, and means for applying a periodic control potential to said control electrode having a frequency less than the spontaneous charging and discharging frequency of said storage capacitor in the absence of said control potential.

References Cited in the file of this patent

UNITED STATES PATENTS

| | | |
|---|---|---|
| 2,070,435 | Katzman | Feb. 9, 1937 |
| 2,179,105 | Sidney | Nov. 7, 1939 |